United States Patent [19]
Taylor et al.

[11] Patent Number: 5,966,583
[45] Date of Patent: Oct. 12, 1999

[54] RECOVERY OF STRONTIUM ACTIVITY FROM A STRONTIUM-82/RUBIDIUM-82 GENERATOR

[75] Inventors: Wayne A. Taylor; Dennis R. Phillips, both of Los Alamos, N.Mex.; Kenneth M. Sosnowski, Freehold Township, N.J.

[73] Assignee: The Regents of the University of California, Los Alamos, N.Mex.

[21] Appl. No.: 09/076,682

[22] Filed: May 12, 1998

[51] Int. Cl.⁶ .............................. C01F 11/00; C01D 17/00
[52] U.S. Cl. ................................................................ 423/2
[58] Field of Search ........................... 423/2, 249, DIG. 7

[56] References Cited

U.S. PATENT DOCUMENTS

| | | | |
|---|---|---|---|
| 3,914,373 | 10/1975 | Jepson | 423/DIG. 7 |
| 3,953,567 | 4/1976 | Grant et al. | 423/2 |
| 3,957,945 | 5/1976 | Grant et al. | 423/2 |
| 4,276,267 | 6/1981 | Bentley et al. | 423/2 |
| 4,400,358 | 8/1983 | Neirinckx | 423/2 |
| 4,406,877 | 9/1983 | Neirinckx et al. | 424/1.1 |
| 4,597,951 | 7/1986 | Gennaro et al. | 423/2 |
| 5,167,938 | 12/1992 | Heaton et al. | 423/2 |

*Primary Examiner*—Steven Bos
*Attorney, Agent, or Firm*—Bruce H. Cottrell

[57] ABSTRACT

Strontium-82 is recovered from spent strontium-82/rubidium-82 generators to provide a source of strontium-82 for additional strontium-82/rubidium-82 generators. The process involves stripping of the strontium-82 from used strontium-82/rubidium-82 generators followed by purification of the strontium-82 material to remove additional metal contaminants to desired levels.

9 Claims, No Drawings

RECOVERY OF STRONTIUM ACTIVITY FROM A STRONTIUM-82/RUBIDIUM-82 GENERATOR

FIELD OF THE INVENTION

The present invention relates to the chemical separation of strontium and more particularly to the chemical separation of strontium from spent strontium-82/rubidium-82 generators. This invention was made with government support under Contract No. W-7405-ENG-36 awarded by the U.S. Department of Energy. The government has certain rights in the invention.

BACKGROUND OF THE INVENTION

Strontium-82/rubidium-82 biomedical generators are used for cardiovascular imaging applications. Rubidium-82 is the daughter of strontium-82 and is the radionuclide used in the cardiovascular imaging. The strontium-82 is produced through the irradiation of materials such as molybdenum or rubidium in particle accelerators. This process is expensive and requires unique facilities that are not always available.

The strontium-82 activity has then been recovered from the irradiated materials by chemical processing such as described in U.S. Pat. Nos. 3,957,945, 4,276,267, and 5,167,938. The earlier patents described processes involving the use of one or more organic solvents for the selective separation of the strontium. The later patent eliminated the need for organic solvents in the separation thereby eliminating a mixed hazardous waste product.

The strontium-82 from such processing is incorporated into strontium-82/rubidium-82 biomedical generators such as described in U.S. Pat. Nos. 4,406,877 and 4,597,951. Such generators generally include a housing (or column) for containing a support medium for the parent radionuclide, an inlet for introducing an eluant into the housing, and an outlet for withdrawing the eluted radionuclide from the housing. Such generators lose their potency over time as the parent radionuclide decays and eventually the generators are discarded. Such spent generators are themselves a radioactive waste stream with the associated costs. At this time, there are fourteen clinics in the United States using strontium-82/rubidium-82 biomedical generators distributed under the trade name CardioGen® generators. Each generator is initially produced with a strontium-82 loading of about 100 milliCuries. Each generator is then used for one month at which time there are about 50 milliCuries of strontium-82 remaining. After a month, the generator is considered used or spent. The present procedure has been to supply a new generator to each clinic, each month and to collect the used generator for disposal as waste.

As rubidium-82 has become more widely used for cardiovascular imaging, its regular, continual availability and supply have become essential. Periods of prolonged shutdowns of the few facilities capable of producing strontium-82 could threaten the supply of this needed radioisotope to produce the strontium-82/rubidium-82 biomedical generators. Alternative sources of irradiated targets have been investigated and targets from accelerators in Russia have now been used to supply or supplement the needed strontium-82 during periods of time when sources in the United States are not available. Yet, the concern for possible loss of irradiated targets for prolonged periods of time has maintained concerns for alternative sources of strontium-82.

During the present inventors' search for alternative sources, they have now investigated the recovery of strontium-82 activity from the spent strontium-82/rubidium-82 generators. Recovery of such strontium-82 activity from the spent generators could serve as an alternative source of strontium-82, while reducing the overall waste stream from the use of such biomedical generators.

It is an object of this invention to provide a technique to recover strontium radioisotopes from generators that are no longer useful due to low potency, and use the recovered material to produce new generators.

Another object of the present invention is to produce material (i.e., strontium-82) to manufacture generators at reduced cost without the need for accelerator irradiations.

Still another object of the present invention is to minimize what has previously been a radioactive waste stream and convert at least a portion of it into a useful product by recycling strontium activity from spent strontium-82/rubidium-82 biomedical generators.

SUMMARY OF THE INVENTION

To achieve the foregoing and other objects, and in accordance with the purposes of the present invention, as embodied and broadly described herein, a process of recovering strontium-82 activity is provided including contacting a spent strontium-82/rubidium-82 generator, said generator including a column of hydrous tin oxide with strontium-82 bound thereon, with a mineral acid capable of stripping strontium-82 from said generator to form a first-ion containing solution; contacting said first-ion containing solution with a cation exchange resin whereby cations including strontium cations and contaminant cations are adsorbed onto the cation exchange resin; contacting the cation exchange resin including said adsorbed strontium cations and contaminant cations with an amount of dilute mineral acid capable of selectively removing a portion of said contaminant cations without removing said strontium cations; and, contacting the cation exchange resin including said adsorbed strontium cations with an amount of mineral acid capable of substantially completely removing strontium-82 from said cation exchange resin.

The present invention further provides a process of recovering strontium-82 activity is provided including contacting a spent strontium-82/rubidium-82 generator, said generator including a column of hydrous tin oxide with strontium-82 bound thereon, with a mineral acid capable of stripping strontium-82 from said generator to form a first-ion containing solution; contacting said first-ion containing solution with an exchange medium having high selectivity for strontium whereby strontium cations are selectively adsorbed onto the exchange medium while contaminant cations are not adsorbed onto the exchange medium; and, contacting the exchange medium including said adsorbed strontium cations with an amount of liquid capable of removing strontium-82 from said exchange medium.

DETAILED DESCRIPTION

The present invention is concerned with the selective separation of strontium-82 from a spent, depleted or used strontium-82/rubidium-82 biomedical generator. Such a process can produce sufficient quantities of strontium-82 for incorporation into a new or fresh strontium-82/rubidium-82 biomedical generator.

The starting material in the present process is a spent or used strontium-82/rubidium-82 biomedical generator. A spent generator is no longer effective due to low potency.

Such generators are generally a short plastic column (about 2 inches in length and ½ inch in diameter) including an inlet tube and an outlet tube, the column packed with hydrous tin oxide with the strontium-82 loaded or bound onto the hydrous tin oxide. General specifications in commercial strontium-82/rubidium-82 biomedical generators require a strontium-85 to strontium-82 ratio of less than about 5:1. In a new column or generator, the ratio of strontium-85 to strontium-82 is generally from about 1:1 to about 2:1.

By recycling of the spent strontium-82/rubidium-82 biomedical generator, strontium-82 values can be recovered but the ratio of strontium-85 to strontium-82 will be increased. One recovery cycle will generally result in a new generator having a strontium-85 to strontium-82 ratio of about 3:1. Thus, there is a limit to the number of recyclings that can be conducted without substantially enriching the strontium-85 in comparison to the strontium-82. Yet, every recovery and recycle adds to the supply of usable strontium-82, while minimizing the strontium-82 discarded as waste. Mass separation of strontium-85 from strontium-82 could be used to bring the ratio of strontium-85 to strontium-82 down within desired levels.

During recovery and recycle, contaminants present with the strontium-82 must be maintained beneath pre-selected levels. In present commercial generators, the limits on dissolved solids has generally been a level of less than about 5000 micrograms per milliliter ($\mu$g/ml). Common contaminants that have been found during recovery and recycle of strontium-82 have included aluminum, barium, calcium, iron, chromium, manganese, sodium, stable strontium isotopes (strontium-84, strontium-86, strontium-87 and strontium-88), titanium, copper, zinc and tin. While not wishing to be bound by the present explanation, much of the metal contaminants are believed to come from the bed of hydrous tin oxide. Aluminum is a higher concentration contaminant. No radiocontaminants have been observed although strontium-85 is a normal impurity from the original accelerator bombardment process.

Initial recovery of the strontium-82 from a spent generator involves passing a mineral acid through the generator column. Suitable mineral acids include hydrochloric acid, nitric acid, sulfuric acid, hydrobromic acid, hydroiodic acid, and perchloric acid, more preferably, hydrochloric acid and nitric acid. Generally, mineral acid molarities of about 0.5 to 1.5 have been found preferable for the stripping of the strontium from the generator, although higher molarities may be used as well. Higher acid concentrations may cause problems such as dissolution of some tin oxide leading to higher dissolved solids. Multiple elutions are preferred to remove substantially all of the strontium-82 from the spent generator with a minimum of eluant and a minimum of dissolved solids, such multiple elutions generally spaced several hours apart. The eluted solution of strontium-82 generally contains metal contaminants. Additionally, some organic residue may also be present. The organic residue can be eliminated by first evaporating the solution to dryness and then contacting the residue with nitric acid and again evaporating the solution to dryness. The remaining solid residue can then be re-dissolved in a mineral acid such as hydrochloric acid.

Once the strontium-82 has been separated from the spent generator, the recovered material must be purified to achieve the desired level of dissolved solids of less than about 5000 $\mu$g/ml. Such purification can be accomplished by using conventional cation exchange resins (columns) or other exchange mediums. For example, the solution containing the strontium-82 and the metal contaminants can be passed through a cation exchange column whereupon the metal ions will bind to the cation exchange resin. The cation exchange resin is preferably a strong acid resin and can be, e.g., a strong acid resin such as BIO-RAD AG 50 W-X8, available from Bio-Rad Laboratories. Exchange mediums highly specific for the strontium ion, such as Sr•Spec® resin (available from Eichrom Industries, Inc.) can be highly effective in separation of the other metal contaminants as essentially only the strontium-82 (and other strontium isotopes) would be bound to such an exchange medium as a ion-containing solution was passed through a column employing such an exchange medium. The geometry and acid concentration are controlled such that no significant strontium activity is removed from the column during the separation from the contaminant metals. After the desired levels of contaminant metals are washed through, the strontium could then be removed from the column to yield the desired strontium product. Removal of the strontium from an exchange medium such as Sr•Spec® resin can be accomplished by passing a liquid capable of removing strontium from the exchange medium through the column. Such a liquid can be, e.g., water or a dilute mineral acid.

The specific activity of the strontium-82 product recovered from the generator can generally be greater than about 25 Curies/gram and can be recovered with dissolved solids at levels of less than about 5000$\mu$g/ml. The strontium-82 product is with no carrier added.

The present invention is more particularly described in the following examples, which are intended as illustrative only, since numerous modifications and variations will be apparent to those skilled in the art.

EXAMPLE 1

About 50 ml of 6 molar HCl was passed through each of the generators followed by passing 15 ml of 0.5 molar HCl. The next day, an additional 50 ml of 6 molar HCl was passed through the generators. The solutions were evaporated to dryness. The dried material was dissolved in 0.1 molar HCl and placed on a 25 ml cation exchange column (BIO-RAD AG 50X8, about 100–200 mesh). The cation exchange column was washed with 1 molar HCl until strontium activity was observed coming off the column. The strontium was then removed from the column using 250 ml of 4 molar HCl. The resulting solution was evaporated to dryness, fumed with nitric acid and converted back to the chloride. The strontium activity was dissolved in a known volume of 0.1 molar HCl and the product assayed. The results indicated that from 95–100 percent of the strontium-82 values had been recovered from each spent generator with a total recovery of 30 to 40 milliCuries. As the strontium-82 continues to decay during the process, time is critical. That decay accounted for the total recovery being less than what was initially in the spent generator although essentially no strontium-82 remained in the spent generator column.

EXAMPLE 2

About 50 ml of 6 molar HCl was passed through each of the generators followed by passing 15 ml of water. The next day, a second 50 ml of 6 molar of HCl was passed through the generators. The solutions were evaporated to dryness and the dried material dissolved in 20 ml of 6 molar nitric acid. The solution was passed through a 10 ml Sr•Spec® resin (from Eichrom Industries, Inc.) column. The column was washed with a cummulative amount of 20 ml of 3 molar nitric acid in several washes to further separate metal contaminants from the strontium in the column. The strontium activity was then removed from the column with 50 ml of water. The resulting solution was evaporated to dryness. The remaining residue was dissolved in a known volume of 0.1 molar HCl and the product assayed. The results indicated that from 95–100 percent of the strontium-82 values had been recovered from each spent generator with a total recovery of 30 to 40 milliCuries.

EXAMPLE 3

About 25 ml of 0.5 molar HCl was passed through each of the generators. The next day, an additional 25 ml of 0.5 molar HCl was passed through the generators. The solutions were evaporated to dryness. The dried material was dissolved in 0.1 molar HCl and placed on a 35 ml cation exchange column (BIO-RAD AG 50X8, about 100–200 mesh). The cation exchange column was washed with 1 molar HCl until strontium activity was observed coming off the column. The strontium was then removed from the column using 250 ml of 4 molar HCl. The resulting solution was evaporated to dryness, fumed with nitric acid and converted back to the chloride. The strontium activity was dissolved in a known volume of 0.1 molar HCl and the product assayed. The results again indicated that from 95–100 percent of the strontium-82 values had been recovered from each spent generator with a total recovery of 30 to 40 milliCuries.

Using the above described procedures, strontium-82 and the accompanying strontium-85 radioisotopes can be recovered in relatively pure form. That is, the strontium radioisotopes can be recovered with the desired less than about 5000$\mu$g/ml of dissolved solid contaminants.

Although the present invention has been described with reference to specific details, it is not intended that such details should be regarded as limitations upon the scope of the invention, except as and to the extent that they are included in the accompanying claims.

What is claimed is:

1. A process of recovering strontium-82 activity comprising:

contacting a spent strontium-82/rubidium-82 generator, said generator including a column of hydrous tin oxide with strontium-82 bound thereon, with a mineral acid to strip strontium-82 from said generator to form a first-ion containing solution;

contacting said first-ion containing solution with a cation exchange resin wherein cations including strontium cations and contaminant cations are adsorbed onto said cation exchange resin;

contacting said cation exchange resin having said adsorbed cations including strontium cations and contaminant cations thereon with an amount of a dilute mineral acid to selectively remove at least a portion of said contaminant cations; and, contacting the cation exchange resin having said adsorbed strontium cations thereon with an amount of mineral acid to remove strontium from said cation exchange resin into a second solution.

2. The process of claim 1 wherein said mineral acid is selected from the group consisting of hydrochloric acid, nitric acid, sulfuric acid, hydrobromic acid, hydroiodic acid and perchloric acid.

3. The process of claim 1 wherein said mineral acid is hydrochloric acid.

4. The process of claim 1 further including evaporating said second solution to dryness, treating with nitric acid to remove any organic material and converting said strontium-82 to strontium chloride.

5. A process of recovering strontium-82 activity comprising:

contacting a spent strontium-82/rubidium-82 generator, said generator including a column of hydrous tin oxide with strontium-82 bound thereon, with a mineral acid to strip strontium-82 from said generator to form a first-ion containing solution;

contacting said first-ion containing solution with an exchange medium having high selectivity for strontium cations wherein strontium cations are selectively adsorbed onto the exchange medium while contaminant cations are not adsorbed onto the exchange medium; and, contacting the exchange medium including said adsorbed strontium cations with an amount of liquid to remove strontium from said exchange medium into a second solution.

6. The process of claim 5 wherein said mineral acid is selected from the group consisting of hydrochloric acid, nitric acid, sulfuric acid, hydrobromic acid, hydroiodic acid, and perchloric acid.

7. The process of claim 5 wherein said mineral acid is nitric acid.

8. The process of claim 5 wherein said liquid is water or a dilute mineral acid.

9. The process of claim 5 further including evaporating said second solution to dryness, treating with nitric acid to remove any organic material and converting said strontium-82 to strontium chloride.

* * * * *